United States Patent [19]

Kashiwagi

[11] Patent Number: 5,713,405
[45] Date of Patent: Feb. 3, 1998

[54] METHOD AND APPARATUS FOR TRANSMITTING ROTATION DRIVING FORCE TO SPINDLES

[75] Inventor: Shigeru Kashiwagi, Kanagawa-ken, Japan

[73] Assignee: Fuji Photo Film Co., Ltd., Kanagawa-ken, Japan

[21] Appl. No.: 552,314
[22] Filed: Nov. 8, 1995

[30] Foreign Application Priority Data

Nov. 10, 1994 [JP] Japan .................................. 6-276331

[51] Int. Cl.⁶ ...................................................... B65G 17/32
[52] U.S. Cl. ............................ 198/378; 198/395; 192/84.3
[58] Field of Search ...................................... 198/378, 394, 198/395; 310/103; 192/84.3

[56] References Cited

U.S. PATENT DOCUMENTS

| | | | |
|---|---|---|---|
| 2,341,554 | 2/1944 | Johnson et al. | 198/378 |
| 2,768,316 | 10/1956 | Neiss | 310/103 |
| 3,183,385 | 5/1965 | Gabriel | 310/103 |
| 4,954,044 | 9/1990 | Chizaki | 198/394 |

FOREIGN PATENT DOCUMENTS 2849126  6/1979  Germany ............................ 198/378

Primary Examiner—Joseph E. Valenza
Attorney, Agent, or Firm—Young & Thompson

[57] ABSTRACT

In a method for transmitting rotation driving force to spindles, a plurality of spindles are intermittently conveyed one after another to a predetermined position, and rotation driving force is transmitted to a spindle, which has been conveyed to the predetermined position. A driving-side magnet coupling is located at the predetermined position. Each of driven-side magnet couplings, which correspond to the driving-side magnet coupling, is secured to an axial end of one of the plurality of the spindles such that the driven-side magnet coupling may be coaxial with the corresponding spindle and such that the driving-side magnet coupling and the driven-side magnet coupling may stand facing each other via a predetermined gap at the predetermined position. The driving-side magnet coupling is rotated, and the rotation driving force is thereby transmitted to the spindle, which has been conveyed to the predetermined position.

21 Claims, 4 Drawing Sheets

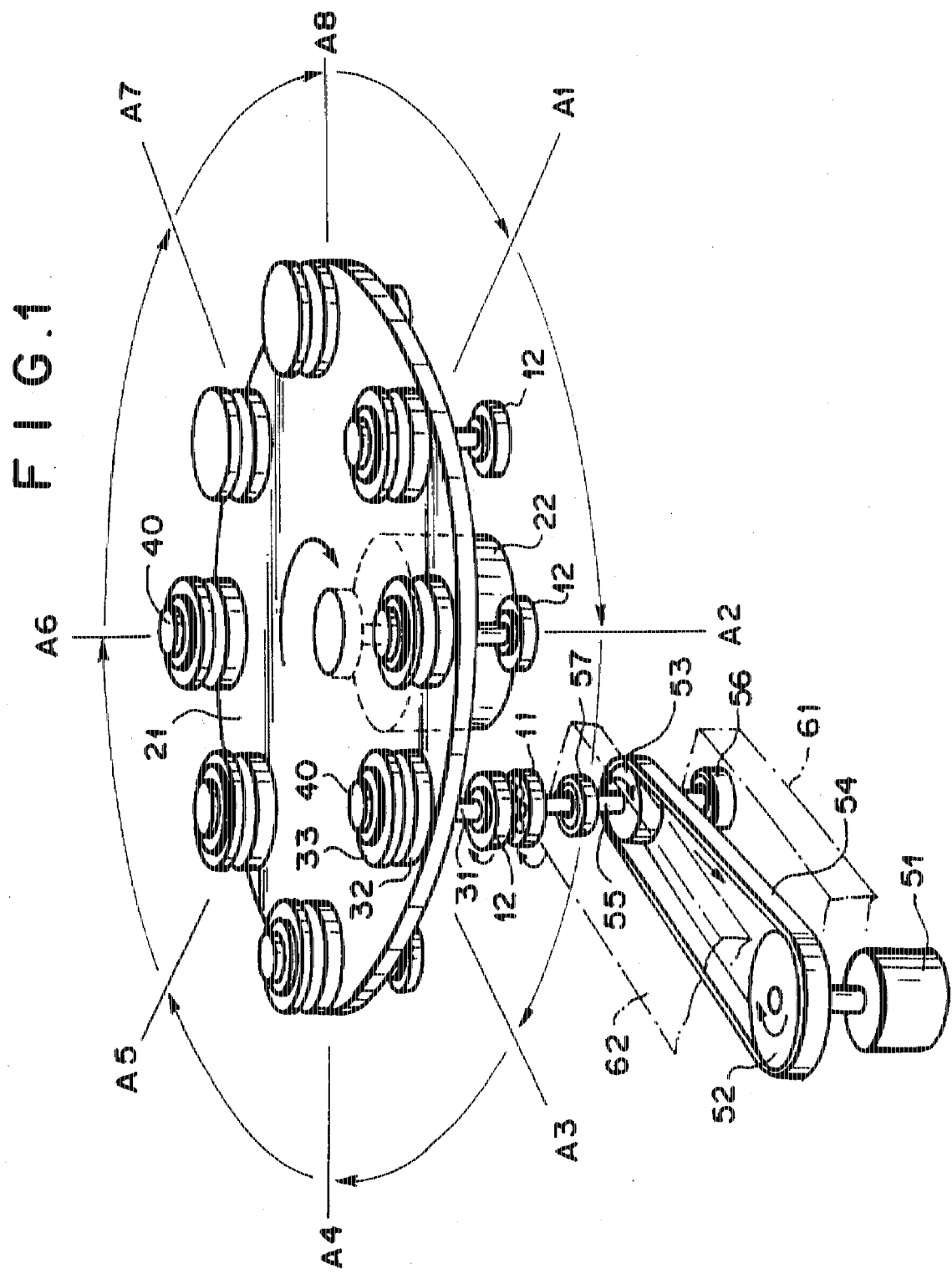

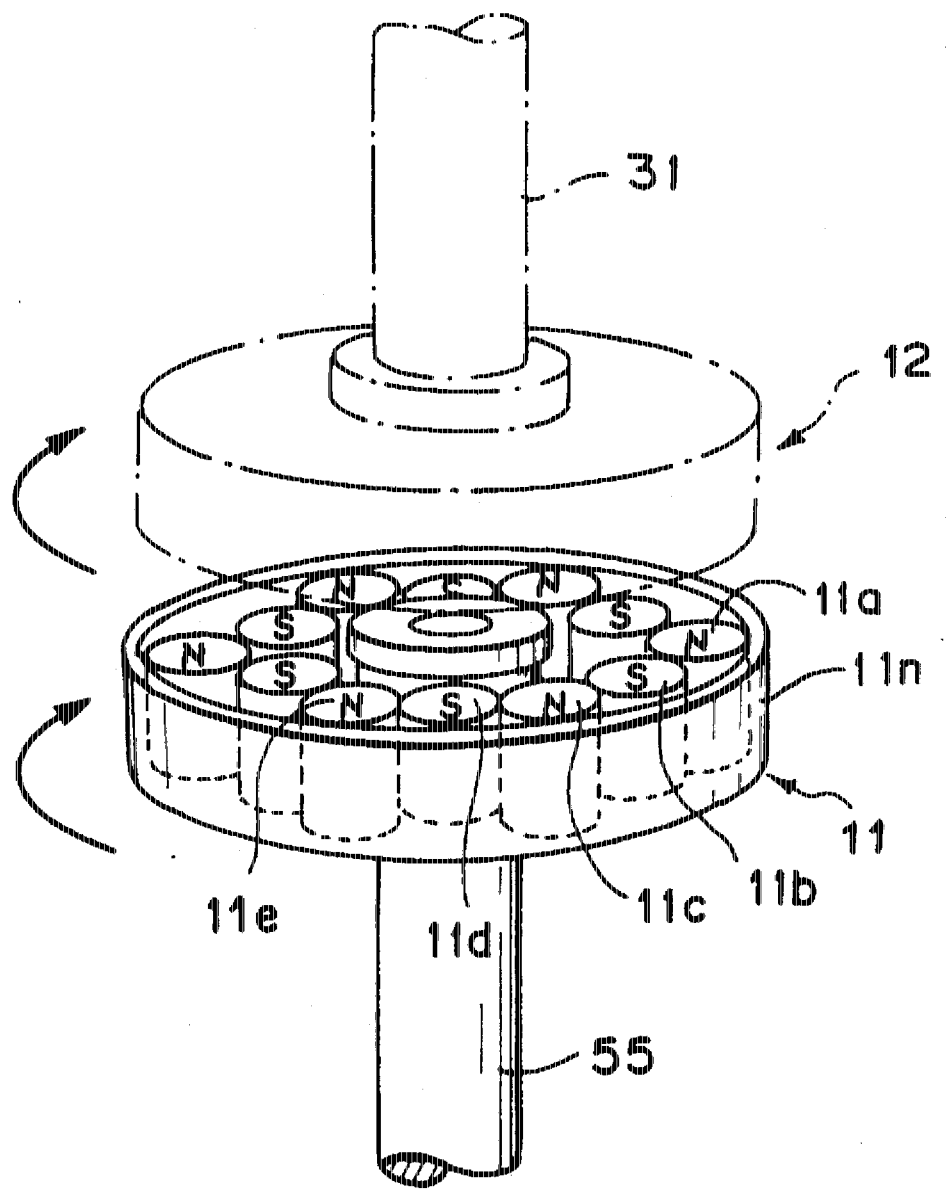

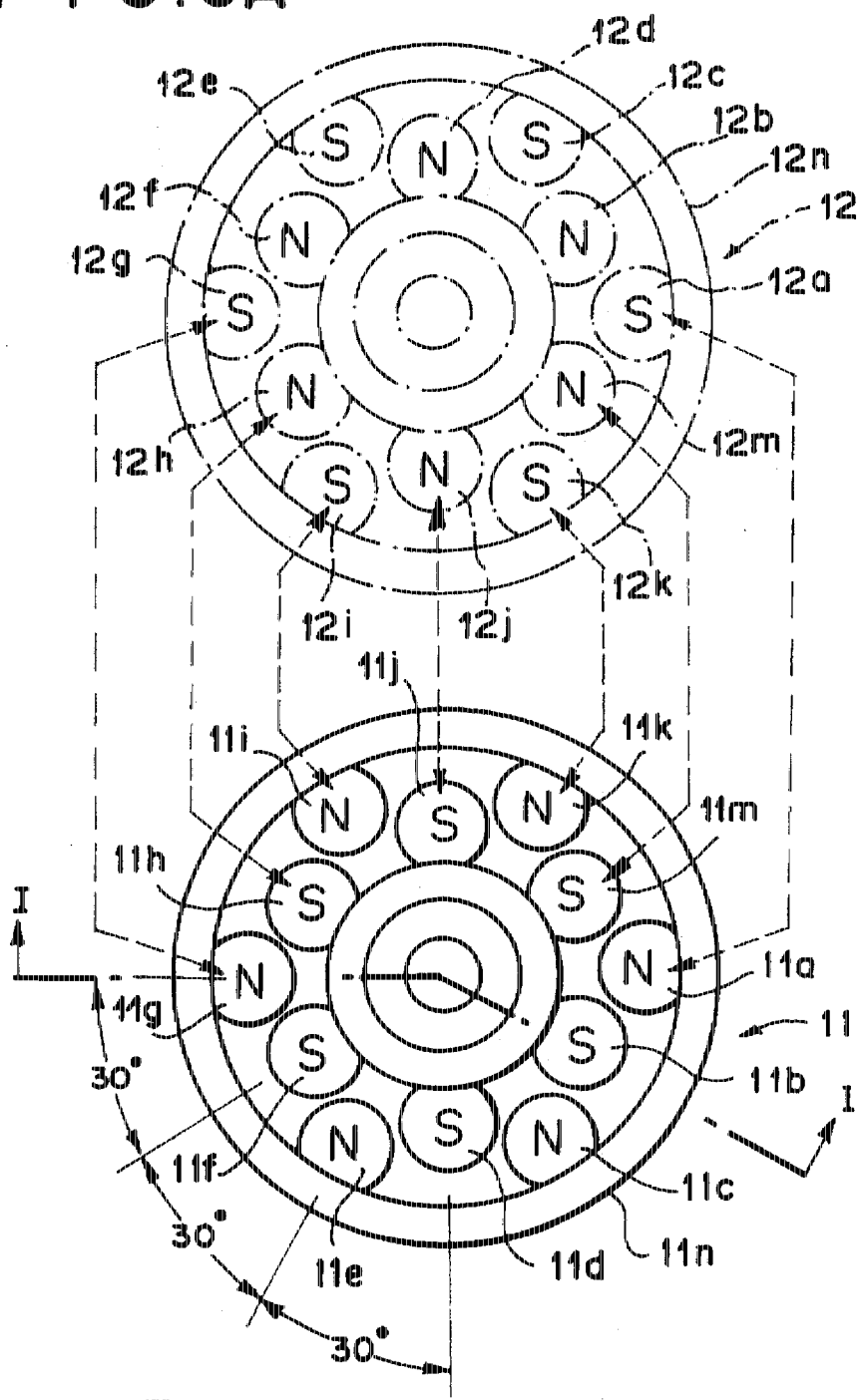
FIG.3A
FIG.3B
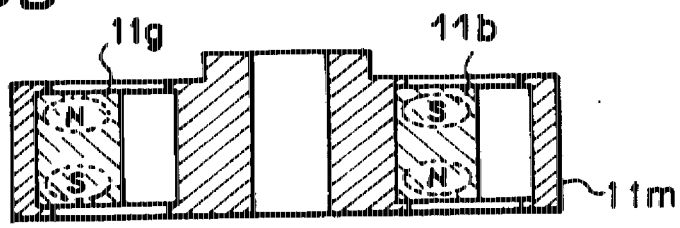

ND APPARATUS FOR
METHOD AND APPARATUS FOR TRANSMITTING ROTATION DRIVING FORCE TO SPINDLES

BACKGROUND OF THE INVENTION

1. Field of the Invention

This invention relates to a method and apparatus for transmitting rotation driving force to spindles. This invention particularly relates to a method and apparatus for transmitting rotation driving force to spindles, wherein a plurality of spindles are intermittently conveyed one after another to a predetermined position, and rotation driving force is transmitted to a spindle, which has been conveyed to the predetermined position, without the rotation driving side coming into contact with the spindle.

2. Description of the Prior Art

Spindles are constructed such that a workpiece to be processed may be supported on one axial end of each spindle, and rotation driving force may be transmitted to the spindle in order to rotate the spindle around its axis. While the spindle is being thus rotated, a predetermined processing or predetermined treatment is carried out on the workpiece. Ordinarily, the rotation driving force, which has been generated by a driving force generating means, such as a motor, is transmitted to the spindle via gears, a belt, or the like.

The spindles are often utilized in a flow process. Specifically, a plurality of spindles are located at predetermined intervals and intermittently conveyed to a predetermined position one after another. After a spindle is thus conveyed intermittently and stopped at the predetermined position, or while the spindle is being conveyed, a processing or treatment is carried out on the workpiece, which is supported on one end of the spindle. It is a common practice to thus carry out a plurality of processes successively in a flow process. In such cases, since the spindles move, they cannot be kept in the state coupled with the driving force generating means regardless of whether transmission means, such as gears or belts, are or are not provided. Therefore, it is necessary to locate a means capable of taking a coupling state and a non-coupling state, i.e. a means for changing over between transmission and non-transmission of the driving force, at a position between the spindle and the driving force generating means.

As the means for changing over the transmission of the driving force, a system utilizing an electromagnetic clutch and an armature and a system utilizing a touch roll and a swing arm have heretofore been known.

With the system utilizing the electromagnetic clutch and the armature, the driving force having been generated by a driving force generating means is transmitted to a driving shaft having one end, to which the electromagnetic clutch is secured, via a belt, gears, or the like. The shaft is thereby rotated around its axis, and the electromagnetic clutch is rotated together with the shaft. Also, the armature is associated via a tension spring with one end of each spindle, which end stands facing the electromagnetic clutch. When the spindle has been conveyed to the predetermined position, at which the electromagnetic clutch is located, the electromagnetic clutch is energized and excited, and the armature is thereby attracted to and brought into contact with the electromagnetic clutch against the urging force of the tension spring. The armature is thus combined with the electromagnetic clutch into an integral body and rotated around its axis. In this manner, the rotation driving force is transmitted to the spindle.

With the system utilizing the touch roll and the swing arm, the driving force having been Generated by a driving force Generating means is transmitted to a driving-side touch roll via a belt, gears, or the like. The driving-side touch roll serves as a friction wheel and is associated with one end of the swing arm, which can swing in a predetermined plane. The driving-side touch roll is thereby rotated around its axis. Also, a driven-side touch roll is secured to each spindle coaxially therewith. When the spindle has been conveyed to a predetermined position in the vicinity of the driving-side touch roll, the swing arm swings in order to bring the driving-side touch roll into contact with the driven-side touch roll. The rotation driving force is thus transmitted to the spindle by the frictional force occurring between the two touch rolls.

However, with the system utilizing the electromagnetic clutch and the armature, when the electromagnetic clutch is not energized as described above, the armature and the electromagnetic clutch must be separated from each other. When the electromagnetic clutch is energized, the armature must be attracted to the electromagnetic clutch against the urging force of the tension spring and must thus be brought into contact with the electromagnetic clutch. Therefore, the gap between the electromagnetic clutch and the armature must be adjusted to be narrow and accurately. Such an adjustment is not easy to carry out. Also, the initial length and the elastic force of the tension spring, which supports the armature to the spindle, often change with the passage of time. Therefore, the gap between the electromagnetic clutch and the armature must be adjusted periodically. Further, it is necessary to accurately align the axes of the armature and the electromagnetic clutch, which are located at the predetermined position, with each other. Such an alignment is not easy to carry out. Furthermore, the gap having been adjusted in the manner described above is apt to be clogged with dust, or the like. When the electromagnetic clutch and the armature are brought into contact with each other, dust, or the like, is confined between the electromagnetic clutch and the armature. As a result, the electromagnetic clutch and the armature cannot come into close contact with each other, and the rotation driving force cannot be perfectly transmitted to the spindle. The problems regarding the confinement of dust, or the like, are increased when the gap between the electromagnetic clutch and the armature becomes narrower due to a change in the initial length and the elastic force of the tension spring.

With the system utilizing the touch roll and the swing arm, the problems often occur in that dust, or the like, clings between the driving-side touch roll and the driven-side touch roll, and a rotation failure is thereby caused to occur. A rotation failure also occurs due to abrasion of the touch rolls.

SUMMARY OF THE INVENTION

The primary object of the present invention is to provide a method for transmitting rotation driving force to spindles, wherein a plurality of spindles are intermittently conveyed one after another to a predetermined position, and rotation driving force is transmitted to a spindle, which has been conveyed to the predetermined position, and wherein ease of maintenance, is enhanced.

Another object of the present invention is to provide an apparatus for carrying out the method for transmitting rotation driving force to spindles.

The present invention provides a method for transmitting rotation driving force to spindles, wherein a plurality of spindles are intermittently conveyed one after another to a predetermined position, and rotation driving force is transmitted to a spindle, which has been conveyed to the predetermined position, the method comprising the steps of:

i) locating a driving-side magnet coupling at the predetermined position, ii) securing each of driven-side magnet couplings, which correspond to the driving-side magnet coupling, to an axial end of one of the plurality of the spindles such that the driven-side magnet coupling may be coaxial with the corresponding spindle and such that the driving-side magnet coupling and the driven-side magnet coupling may stand facing each other via a predetermined gap at the predetermined position, and iii) rotating the driving-side magnet coupling, whereby the rotation driving force is transmitted to the spindle, which has been conveyed to the predetermined position.

The term "predetermined gap" as used herein for the method for transmitting rotation driving force to spindles in accordance with the present invention means a gap such that it may be possible to obtain a magnetic force, by which the driven-side magnet coupling can be caused to rotate by the rotation of the driving-side magnet coupling when the driving-side magnet coupling is rotated. Specifically, in the conventional system utilizing the electromagnetic clutch and the armature, the gap between the electromagnetic clutch and the armature is, for example, 0.15 mm (tolerance: 0.05 mm, the accuracy of centering of the electromagnetic clutch and the armature: 0.05 mm). On the other hand, with the method for transmitting rotation driving force to spindles in accordance with the present invention, in cases where the performance (the driving torque, or the like) equivalent to the performance of the electromagnetic clutch is to be obtained, the gap between the driving-side magnet coupling and the driven-side magnet coupling can be set to be 2 mm (tolerance: 0.5 mm, the accuracy of centering of the two magnet couplings: 1.0 mm), which is wider than the gap between the electromagnetic clutch and the armature.

The present invention also provides an apparatus for transmitting rotation driving force to spindles, comprising:

i) a driving-side magnet coupling, which is located at a predetermine position, ii) a plurality of spindles, each with a driven-side magnet coupling which is secured to an axial end of one of its respective the plurality of the spindles such that the driven-side magnet coupling may be coaxial with the corresponding spindle, iii) a conveyance means, which intermittently conveys the plurality of the spindles one after another to the predetermined position such that the driving-side magnet coupling and the driven-side magnet coupling may stand facing each other via a predetermined gap at the predetermined position, and iv) a rotation driving means, which rotates the driving-side magnet coupling around its axis.

The term "predetermined gap" as used herein for the apparatus for transmitting rotation driving force to spindles in accordance with the present invention has the same meaning as the meaning of the term "predetermined gap" used for the method for transmitting rotation driving force to spindles in accordance with the present invention.

With the method for transmitting rotation driving force to spindles in accordance with the present invention, the plurality of the spindles are conveyed one after another to the predetermined position. The driven-side magnet coupling secured to the spindle, which has been conveyed to and stopped at the predetermined position, stands facing the driving-side magnet coupling, which is located at the predetermined position, via the predetermined gap. The driven-side magnet coupling is thus rotated by the rotation of the driving-side magnet coupling.

With the apparatus for transmitting rotation driving force to spindles in accordance with the present invention, the plurality of the spindles are intermittently conveyed by the conveyance means one after another to the predetermined position, at which the driving-side magnet coupling is located. The driven-side magnet coupling secured to the spindle, which has been conveyed to the predetermined position, stands facing the driving-side magnet coupling via the predetermined gap. The driving-side magnet coupling is rotated around its axis by the rotation driving means. The driven-side magnet coupling, which stands facing the driving-side magnet coupling, is thus rotated by the rotation of the driving-side magnet coupling.

Thus with the apparatus and method for transmitting rotation driving force to spindles in accordance with the present invention, the rotation driving force can be transmitted to the spindle, which has been conveyed to the predetermined position, without the driving-side magnet coupling coming into contact with the spindle. Therefore, the couplings are not abraded. Accordingly, the apparatus and method for transmitting rotation driving force to spindles in accordance with the present invention is free from the problems of the conventional system regarding the abrasion of touch rolls due to frictional force, elongation of the tension spring with the passage of time, a change in the elastic force with the passage of time, and the like. As a result, periodic adjustment and component exchange are not necessary. Also, the gap between the driving-side magnet coupling and the driven-side magnet coupling can be wider than the gap between the electromagnetic clutch and the armature, and the two magnet couplings are not brought into contact with each other. Therefore, even if dust, or the like, enters into the gap, it will not be confined in the gap as in the gap between the electromagnetic clutch and the armature. Accordingly, a rotation failure due to the confinement of dust, or the like, does not occur. The magnetic couplings are constitute of permanent magnets and, therefore, can be used semi-permanently.

Further, with the method and apparatus for transmitting rotation driving force to spindles in accordance with the present invention, since the non-contact magnet couplings are used, the method and the apparatus can be utilized in air and in a liquid. The method and apparatus for transmitting rotation driving force to spindles in accordance with the present invention can also be utilized as a braking method or a braking apparatus, wherein the spindle which is rotating is stopped by stopping the driving-side magnet coupling.

BRIEF DESCRIPTION OF THE DRAWINGS

FIG. 1 is a perspective view showing a first embodiment of the apparatus for transmitting rotation driving force to spindles in accordance with the present invention, FIG. 2 is a perspective view showing magnet couplings, which are used in the embodiment of FIG. 1, FIG. 3A is an explanatory view showing the relationship between the positions of corresponding magnets of a driving-side magnet coupling and a driven-side magnet coupling, which stand facing each other, FIG. 3B is a sectional view taken along line I—I of FIG. 3A.

DESCRIPTION OF THE PREFERRED EMBODIMENTS

Figure 4:
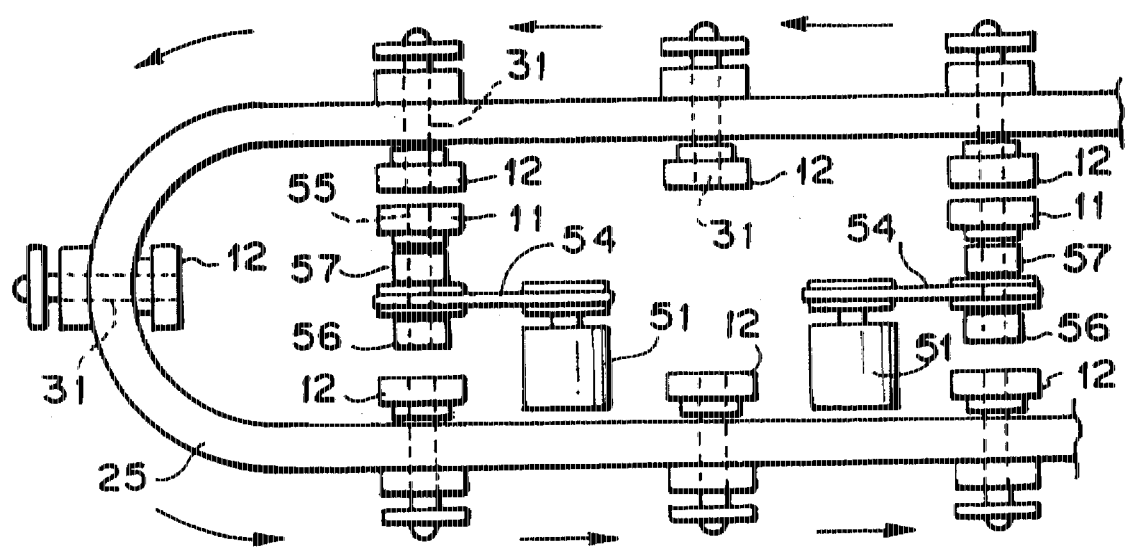
FIG. 4 is a side view showing a second embodiment of the apparatus for transmitting rotation driving force to spindles in accordance with the present invention.

The present invention will hereinbelow be described in further detail with reference to FIGS. 1–3B.

In this embodiment, a rotatable table 21 is intermittently rotated in the circumferential direction by a motor 22. Eight spindles 31, 31, . . . are located at equal intervals along the circumferential direction and in the vicinity of the periphery of the rotatable table 21. Each of the spindles 31, 31, . . . is supported by a bearing 32 such that the spindle 31 can rotate. A driven-side magnet coupling 12 is secured to a lower end of each spindle 31 such that it may be coaxial with the shaft of the spindle 31. A workpiece receiving member 33, on which a workpiece to be processed is placed, is secured to an upper end of each spindle 31. The rotatable table 21 is rotated intermittently such that it may stop each time it has rotated 45 degrees in the direction of rotation. The positions of the spindles 31, 31, . . . in the stopped state are referred to as A1, A2, . . . , A8. As the workpieces, for example, center cores 40, 40, . . . of 3.5-inch micro floppy disks (3.5-inch MFD) are placed on the workpiece receiving members 33, 33, . . . . Various processings, or the like, are carried out in the respective processes at the positions A1 through A6, at which the spindles 31, 31, . . . are located when the rotatable table 21 are stopped intermittently. For example, in the process at the position A3, the spindle 31 is rotated, and an adhesive agent is applied to the flange of the center core 40.

At the position A3, a driving-side magnet coupling 11 is located such that it may stand facing the driven-side magnet coupling 12 of the spindle 31, which is supported by the rotatable table 21, via a predetermined gap.

The driving-side magnet coupling 11 is secured to an upper end of a driving shaft 55 such that it may be coaxial with the driving shaft 55. The driving shaft 55 is supported by support members 61 and 62 vial radial bearings 56 and 57 such that it can rotate. A driving pulley 53 is secured to a portion of the driving shaft 55, which portion is located between the radial bearings 56 and 57. Rotation driving force is generated by a driving motor 51 and transmitted by a transmission belt 54 to the driving pulley 53. In this manner, the driving shaft 55 is rotated around its axis.

As illustrated in FIG. 2, the driving-side magnet coupling 11 comprises a cylindrical case housing 11n and twelve magnets 11a, 11b, 11c, 11d, 11e, 11f, 11g, 11h, 11i, 11j, 11k, and 11m, which are accommodated in the cylindrical case housing 11n. The twelve magnets are located at 30-degree intervals around the rotation center axis such that north poles N, N, . . . and south poles S, S, . . . may be located alternately. Each magnet may be constituted of an Sm—Co magnet (having a magnetic force of, for example, 2,800 gausses). The magnetic force may fall within the range of approximately 300 gausses to approximately 8,000 gausses, and should preferably fall within the range of 1,000 to 5,000 gausses such that a predetermined driving torque can be obtained. The number of the magnets accommodated in the case housing 11n is not limited to twelve and may be selected appropriately in accordance with the size of the case housing 11n, the required driving torque, or the like. For example, the number of the magnets may be six, eight, ten, and so on.

As illustrated in FIG. 3A, the magnets 11a, 11c, 11e, 11g, 11i, and 11k, which have the north poles N, N, . . . facing up, are located close to the outer peripheral wall of the case housing 11n. Also, the magnets 11b, 11d, 11f, 11h, 11j, and 11m, which have the south poles S, S, . . . facing up, are located close to the inner peripheral wall of the case housing 11n. In cases where the magnets are located in this manner, the magnets having a larger size can be efficiently accommodated in the case housing 11n having a predetermined size. Further, as illustrated in FIG. 3A, the driven-side magnet coupling 12 comprises a cylindrical case housing 12n and twelve magnets 12a, 12b, 12c, 12d, 12e, 12f, 12g, 12h, 12i, 12j, 12k, and 12m, which are accommodated in the cylindrical case housing 11n. The magnets 12a, 12c, 12e, 12g, 12i, and 12k, which have the south poles S, S, . . . facing down, are located close to the 5 outer peripheral wall of the case housing 12n. The magnets 12b, 12d, 12f, 12h, 12j, and 12m, which have the north poles N, N, . . . facing down, are located close to the inner peripheral wall of the case housing 12n. The driven-side magnet coupling 12 constructed in this manner is caused to stand facing the driving-side magnet coupling 11, and the stability of the magnetic force acting between the two magnet couplings can thereby be enhanced.

How this embodiment operates will be described hereinbelow.

The rotatable table 21 provided with the eight spindles 31, 31, . . . are intermittently rotated by the motor 22 such that each spindle 31 may be conveyed successively to the positions A1, A2, . . . , A8. The center core 40 is conveyed from the exterior of the apparatus for transmitting rotation driving force to spindles and placed on the workpiece receiving member 33 of the spindle 31, which is located at the position A1. When a predetermined length of time has elapsed, the motor 22 rotates the rotatable table 21 in order to convey the spindles 31, 31, such that the spindle 31 having been located at the position A1 may be conveyed to the position A2, the spindle 31 having been located at the position A2 may be conveyed to the position A3, and so on. The center core 40, which has been placed on the workpiece receiving member 33 of the spindle 31 at the position A1, is conveyed to the position A2 together with the spindle 31. At the position A2, a predetermined processing is carried out on the center core 40.

Further, when a predetermined length of time has elapsed, the motor 22 rotates the rotatable table 21, and the spindles 31, 31, . . . are thereby conveyed to the next positions (the next processes). The spindle 31, on which the center core 40 having been processed at the position A2 is placed, advances to the position A3. At the position A3, the driven-side magnet coupling 12, which is secured to the lower end of the spindle 31, stands facing the driving-side magnet coupling 11 via the predetermined gap. As illustrated in FIG. 3A, since the spindle 31 can rotate with respect to the rotatable table 21, the driven-side magnet coupling 12 is stabilized in the state such that the magnets 12a, 12c, 12e, 12g, 12i, and 12k, which have the south poles S, S, . . . facing down, may stand facing the magnets 11a, 11c, 11e, 11g, 11i, and 11k of the driving-side magnet coupling 11, which have the north poles N, N, . . . facing up, and such that the magnets 12b, 12d, 12f, 12h, 12j, and 12m, which have the north poles N, N, . . . facing down, may stand facing the magnets 11b, 11d, 11f, 11h, 11j, and 11m of the driving-side magnet coupling 11, which have the south poles S, S, . . . facing up.

The rotation driving force is generated by the driving motor 51 and transmitted to the driving-side magnet coupling 11 via a motor pulley 52, the transmission belt 54, the driving pulley 53, and the driving shaft 55. The driving-side magnet coupling 11 is thus rotated around its axis. When the driving-side magnet coupling 11 is thus rotated, the driven-side magnet coupling 12, which stands facing it, is also rotated following up the driving-side magnet coupling 11 by the magnetic force.

As described above, the driven-side magnet coupling 12 is secured to the lower end of the spindle 31, and the spindle 31 is supported by the rotatable table 21 such that it can rotate. Therefore, the spindle 31 is rotated following up the driving-side magnet coupling 11, and the center core 40, which is placed on the workpiece receiving member 33 secured to the upper end of the spindle 31, is also rotated. At the position A3, an adhesive agent is applied to the entire circumference of the flange of the center core 40 while the center core 40 is being rotated.

When the application of the adhesive agent is completed, the motor 22 rotates the rotatable table 21, and the spindles 31, 31, . . . are respectively conveyed to the next processes. Finally, at the position A6, the center core 40 is conveyed from the workpiece receiving member 33 to the exterior of the apparatus for transmitting rotation driving force to spindles. The operations described above are the same for all of the eight spindles 31, 31, . . . , which are supported by the rotatable table 21. In cases where the rotation torque acting between the two magnet couplings 11 and 12 is set to fall within the range of 40 to 600 gcm, it is necessary for the predetermined gap between the two magnet couplings 11 and 12 at the position A3 and the deviation between the center axes of the two magnet couplings 11 and 12 to be adjusted respectively to be 2.0±0.5 mm and ±1.0 mm. On the other hand, in cases where the same rotation torque is to be obtained with the electromagnetic clutch, it is necessary for the gap between the electromagnetic clutch and the armature and the accuracy of centering of the electromagnetic clutch and the armature to be adjusted respectively to be 0.15±0.05 mm and ±0.05 mm. From the foregoing, it is clear that the adjustment work for the magnet couplings in the apparatus for transmitting rotation driving force to spindles in accordance with the present invention is easier than the adjustment work for the conventional system utilizing the electromagnetic clutch and the armature.

The apparatus for transmitting rotation driving force to spindles in accordance with the present invention is not limited to the aforesaid embodiment, wherein the plurality of the spindles 31, 31, . . . are supported by the rotatable table 21. For example, as in the second embodiment illustrated in FIG. 4, the spindles 31, 31, . . . may be supported by a conveyor 25, which undergoes linear intermittent movement. The constitution, the operations, and the effects of the second embodiment of FIG. 4 are the same as those of the first embodiment described above, except that the conveyor 25 is utilized in lieu of the rotatable table 21, and the rotation driving force is transmitted to the spindles at two positions among the intermittent stop positions.

What is claimed is:

1. A method for transmitting rotation driving force to spindles, wherein a plurality of spindles are intermittently conveyed one after another to a predetermined position, and rotation driving force is transmitted to a spindle, which has been conveyed to the predetermined position, the method comprising the steps of:

locating a driving-side magnet coupling at the predetermined position, the driving-side magnet coupling having a plurality of magnets which are located such that north poles are alternated with south poles on a single same side thereof;

securing each of driven-side magnet couplings, which correspond to said driving-side magnet coupling, to an axial end of one of the plurality of the spindles such that said driven-side magnet coupling may be coaxial with the corresponding spindle and such that said driving-side magnet coupling and said driven-side magnet coupling may stand facing each other via a predetermined gap at the predetermined position, the driven-side magnet having a plurality of magnets which are located such that north poles are alternated with south poles on a single same side thereof;

rotating said driving-side magnet coupling, whereby the rotation driving force is transmitted to the spindle, which has been conveyed to the predetermined position; and arranging a plurality of the driving-side magnets in a case housing such that the magnets with first poles facing said single same side are located close to an outer peripheral wall of said case housing and such that the magnets with second poles facing said single same side are located close to an inner peripheral wall of said case housing.

2. A method as defined in claim 1 wherein the plurality of said spindles are supported by a rotatable table and located along the direction of the circumference of the rotatable table.

3. A method as defined in claim 1 wherein the plurality of said spindles are supported by a conveyor, which undergoes linear intermittent movement.

4. A method as defined in claim 1 wherein the predetermined gap between said driving-side magnet coupling and said driven-side magnet coupling, which stand facing each other at the predetermined position, falls within the range of 1.5 mm to 2.5 mm.

5. A method as defined in claim 1 wherein each of said magnets has a magnetic force falling within the range of approximately 300 gausses to approximately 8,000 gausses.

6. A method as defined in claim 1 wherein the plurality of said magnets are accommodated in a case housing of said driven-side magnet couplings such that the magnets with second poles facing said single same side of each magnet coupling are located close to an outer peripheral wall of said case housing, and such that the magnets with first poles facing said single same side of each magnet coupling are located close to an inner peripheral wall of said case housing.

7. A method as defined in claim 1 wherein the number of said magnets in each of said driving-side magnet coupling and said driven-side magnet couplings falls within the range of six to twelve.

8. An apparatus for transmitting rotation driving force to spindles, comprising:

i) a driving-side magnet coupling, which is located at a predetermined position, ii) a plurality of spindles, each of driven-side magnet couplings, which correspond to said driving-side magnet coupling, being secured to an axial end of one of the plurality of said spindles such that said driven-side magnet coupling may be coaxial with the corresponding spindle, iii) a conveyance means, which intermittently conveys the plurality of said spindles one after another to said predetermined position such that said driving-side magnet coupling and said driven-side magnet coupling may stand facing each other via a predetermined gap at said predetermined position, and iv) a rotation driving means, which rotates said driving-side magnet coupling around its axis, wherein each of said driving-side magnet coupling and said driven-side magnet couplings comprises a plurality of magnets, which are located such that north poles are alternated with south poles on a single same side of each said magnet coupling, and wherein the plurality of said magnets are accommodated in a case housing of said driving-side magnet coupling such that the magnets with first poles facing said single same side of each magnet coupling are located close to an outer peripheral wall of said case housing, and such that the magnets with second poles facing said single same side of each magnet coupling are located close to an inner peripheral wall of said case housing.

9. An apparatus as defined in claim 8 wherein said conveyance means comprises a rotatable table, which supports the plurality of said spindles such that they may be located along the direction of the circumference of the rotatable table.

10. An apparatus as defined in claim 8 wherein said conveyance means comprises a conveyor, which supports the plurality of said spindles and undergoes linear intermittent movement.

11. An apparatus as defined in claim 8 wherein the predetermined gap between said driving-side magnet coupling and said driven-side magnet coupling, which stand facing each other at the predetermined position, falls within the range of 1.5 mm to 2.5 mm.

12. An apparatus as defined in claim 8 wherein each of said magnets has a magnetic force falling within the range of approximately 300 gausses to approximately 8,000 gausses.

13. An apparatus as defined in claim 8 wherein the plurality of said magnets are accommodated in a case housing of said driven-side magnet couplings such that the magnets with second poles facing said single same side of each magnet coupling are located close to an outer peripheral wall of said case housing, and such that the magnets with first poles facing said single same side of each magnet coupling are located close to an inner peripheral wall of said case housing.

14. An apparatus as defined in claim 8 wherein the number of said magnets in each of said driving-side magnet coupling and said driven-side magnet couplings falls within the range of six to twelve.

15. An apparatus for transmitting a rotational force to a spindle comprising:

a driven magnetic coupling coaxially affixed to an end of said spindle;

a rotational force imparting magnetic coupling separated by a gap from, and generally coaxial with, said driven magnetic coupling for imparting a rotational force thereto; and each of said driven and force imparting magnetic couplings comprising a plurality of generally cylindrical magnets affixed in an annular space with an annular width greater than a diameter of said magnets, said magnets having their magnetic axes generally parallel to an axis of said spindle so that only one pole faces the gap, and wherein ones of said magnets in said driven magnetic coupling having a first pole facing the gap are arrayed at a first radial distance from a center of said annular space and ones of said magnets having a second pole facing the gap are arrayed at a second radial distance from the center of said annular space.

16. The apparatus of claim 15, wherein ones of said magnets in said force imparting magnetic having the second pole facing the gap are arrayed at the first radial distance and ones of said magnets having the first pole facing the gap are arrayed at the second radial distance.

17. The apparatus of claim 15, where said magnets are circumferentially arrayed in each said annular space.

18. The apparatus of claim 15, further comprising means for moving said driven magnetic coupling into coaxial alignment with said force imparting magnetic coupling.

19. The apparatus of claim 18, wherein axes of said driven and force imparting magnetic couplings have a coaxial alignment tolerance of ±1.0 mm.

20. The apparatus of claim 15, wherein the gap is 1.5 to 2.5 mm wide.

21. The apparatus of claim 15, wherein each of said driven and force imparting magnetic couplings comprises from six to twelve of said magnets.

* * * * *